United States Patent [19]
Wooster et al.

[11] Patent Number: 5,631,069
[45] Date of Patent: May 20, 1997

[54] MEDIUM MODULUS MOLDED MATERIAL COMPRISING SUBSTANTIALLY LINEAR POLYETHLENE AND FABRICATION METHOD

[75] Inventors: Jeffrey J. Wooster, Lake Jackson, Tex.; Theo L. V. Geussens, Meeuwen-Gruitrode; Jozef J. I. Van Dun, Zandhoven, both of Belgium

[73] Assignee: The Dow Chemical Company, Midland, Mich.

[21] Appl. No.: 437,655

[22] Filed: May 9, 1995

Related U.S. Application Data

[63] Continuation-in-part of Ser. No. 239,496, May 9, 1994, abandoned.

[51] Int. Cl.$^6$ .............................. B29C 47/90; C08L 23/04
[52] U.S. Cl. ................. 428/220; 264/568; 264/209.4; 264/141; 525/198; 525/240; 526/348.3; 526/348.5
[58] Field of Search ............................ 264/209.1, 209.4; 525/240, 198; 526/348.5, 348.3

[56] References Cited

U.S. PATENT DOCUMENTS

| | | | |
|---|---|---|---|
| 3,645,992 | 2/1972 | Elston | 525/240 |
| 4,144,111 | 3/1979 | Schaerer | 264/209.1 |
| 4,330,639 | 5/1982 | Matsuura et al. | 525/240 |
| 4,438,238 | 3/1984 | Fukushima et al. | 264/331.17 |
| 4,461,873 | 7/1984 | Bailey et al. | 525/240 |
| 5,102,611 | 4/1992 | Wolfe et al. | 264/568 |
| 5,272,236 | 12/1993 | Lai et al. | 526/348.5 |
| 5,278,272 | 1/1994 | Lai et al. | 526/348.5 |
| 5,284,613 | 2/1994 | Ali et al. | 264/331.17 |
| 5,395,471 | 3/1995 | Obijeski et al. | 526/348.5 |
| 5,408,004 | 4/1995 | Lai et al. | 264/331.17 |
| 5,444,145 | 8/1995 | Brant | 526/348.3 |

FOREIGN PATENT DOCUMENTS

| | | |
|---|---|---|
| 0492656 | 7/1992 | European Pat. Off. . |
| 0533156 | 3/1993 | European Pat. Off. . |
| 57-57737 | 4/1982 | Japan ............... 264/209.1 |

OTHER PUBLICATIONS

P. Vanspeybroeck, *New Test Methods to Evaluate The Resistance to Rapid Crack Propagation in Pressurized Polyethylene Pipes*, Becetel—Laboratory Soete of the University of Gent, Belgium, pp. 1–6.

E. Ceausescu et al., *Systemes Plastomere/Elastomere Thermoplastique Properties Mecaniques Des Compounds De Polyolefines Et De Bloc–Copolymeres Elastomeres Thermoplastiques* Institut de Recherches Chimiques, Bucarest, Revue Roumaine de Chimie, 34, 3, pp. 711–724 (1989).

J. Rhee et al., *Phase Behavior, Morphology, and Mechanical Properties of Polyethylene–Copolymer Blends*, Department of Chemical Engineering, Northwestern University, Evanston, Illinois 60208, USA,, Journal of Polymer Science: Part B: Polymer Physics, vol. 32, pp. 159–169 (1994).

William S. Smith, Jr., *Pelletized Rubber For Polyolefin Plastics Modification*, Exxon Chemical Company, Elastomers Technology Division, Linden, New Jersey, pp. 394–396.

*Primary Examiner*—Jeffery R. Thurlow

[57] ABSTRACT

Medium modulus molded polyethylene materials with improved impact strength are made. The polyethylene material is molded to pipes, bars, and sheets. The molded material comprises high molecular weight linear polyethylene and a substantially linear ethylene/α-olefin interpolymer. The material is more than about 0.23 mm thick, has a density in the range of about 0.923 to about 0.95 grams/cubic centimeter (g/cc) and has an excellent impact resistance.

20 Claims, 1 Drawing Sheet

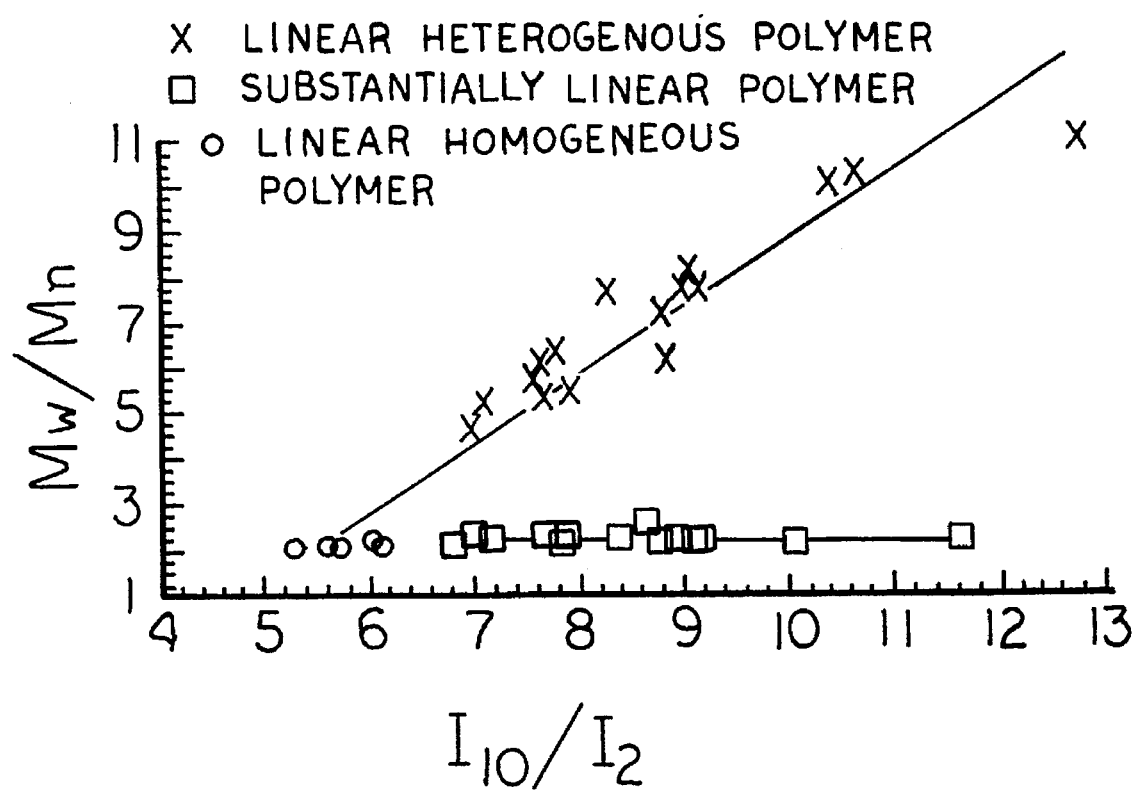

MEDIUM MODULUS MOLDED MATERIAL COMPRISING SUBSTANTIALLY LINEAR POLYETHLENE AND FABRICATION METHOD

CROSS-REFERENCE TO RELATED APPLICATIONS

This application is related to the pending application entitled "Medium Modulus Film and Fabrication Method" filed herewith on May 9, 1994, in the names of Brad A. Cobler, Larry D. Cady, Lisa E. Dodson and Osborne K. McKinney, now abandoned, to pending application Ser. No. 08/054,379 filed Apr. 28, 1993 in the names of Pak-Wing S. Chum, Ronald P. Markovich, George W. Knight and Shih-Yaw Lai, now abandoned, and a continuation-in-part of application, Ser. No. 08/239,496 filed on May 9, 1994, in the names of Jeffrey J. Wooster, Bard A. Cobler, Larry D. Cady, David G. Bertelsman, Lisa E. Dodson and Osborne K. McKinney, now abandoned.

FIELD OF THE INVENTION

This invention pertains to a medium modulus molded polyethylene material and a method for preparing such material. The novel molded material can be prepared by extrusion, compression molding or casting processes. The polyethylene material can be molded to articles, such as pipes, tubes, bars, wire coatings, sheets or molded parts, such as automotive parts, hollow articles, such as containers and the like. The molded material has surprisingly high impact properties.

BACKGROUND OF THE INVENTION

Molded polyethylene materials find wide usage, for example in gas pipe or water pipe applications. Such materials must have a sufficient stiffness to provide long term dimensional stability. Furthermore, they must have a high impact strength to minimize failures during usage. Advantageously, the materials should also be resistant to crack propagation, that means that an accidental crack or failure should stop and not run over extended length of the material.

It is known to blend polyethylene with various polymers to improve its impact properties. E. Ceaucescu et al. (Revue Roumaine de Chimie, 34, 3, 711–724 (1989)) disclose that the shock resistance of a high density polyethylene (HDPE) can be improved by incorporating a butadiene-styrene block copolymer therein. J. Rhee and B. Crist (Journal of Polymer Science: Part B: Polymer Physics, Vol 32, 159–169 (1994)) discuss the plain strain fracture toughness of blends of HDPE and hydrogenated polybutadiene. W. S. Smith (Soc. Plast. Eng., Tech. Pap. (1975), 21, pages 394–396 describe the use of ethylene-propylene rubber for improving the impact strength and/or environmental stress crack resistance of polypropylene. Alternatively, the ethylene-propylene rubber may be blended with low density polyethylene or high density polyethylene.

Matsuura et al., U.S. Pat. No. 4,330,639 disclose a polymer composition to form polyethylene films which are said to have a high impact strength and a high tear strength. The polymer composition comprises an ethylene/$C_3$-$C_8$ α-olefin copolymer having an intrinsic viscosity of 1.3 to 8.3 dl/g and a density of 0.850 to 0.930 and an ethylene polymer having a melt index of 0.01 to 0.2, a flow parameter of 1.9 to 2.8 and a density not lower than 0.940.

Bailey et al. (U.S. Pat. No. 4,461,873) disclose ethylene polymer mixtures having a density in the range of 0.940 to 0.965 g/cc and comprising (a) 40 to 70 weight parts of a high molecular weight, low density ethylene polymer having a high load melt index in the range of about 0.1 to about 1.5 g/10 min., a density of about 0.930 to 0.945 g/cc, a heterogeneity index of less than 10 and having essentially no other branching than short chain branching, and (b) 60 to 30 weight parts of a low molecular weight, high density ethylene polymer having a melt index in the range of 45 to 300 g/10 min., a density above 0.950, a heterogeneity index of less than 6 and being essentially linear. The polymer composition is said to be useful for the production of polyolefin films, pipe production and wire coating. The films are said to have good environmental stress crack behavior.

Shirodkar (U.S. Pat. No. 5,041,501) discloses polymer blends of linear low density polyethylene (LLDPE) with a minor amount of an isotactic, partially crystalline butene-1 polymer for producing blown films having improved impact properties. Shirodkar (U.S. Pat. No. 5,242,922) discloses polymer blends of HDPE with a minor amount of an isotactic, partially crystalline butene-1 polymer for producing containers with lower swell compared to those of the unblended HDPE.

Thiersault et al. (U.S. Pat. No. 4,786,688) discloses polyethylene compositions containing from 50 to 98 weight percent of HDPE and from 2 to 50 weight percent of LLDPE with a density below 0.930. The composition is said to be particularly adapted for the manufacture of films and hollow bodies by blow-molding.

Calabro et al. (U.S. Pat. No. 5,102,955) disclose a low density polymer having a broad molecular weight distribution, such that its melt flow ratio is about 50 to about 250, and a substantially constant melt index-corrected density. The polymer is produced by blending a first polymer component of high molecular weight with a second polymer component of low molecular weight, with both polymer components having substantially the same melt index-corrected density. The polymer is said to produce films having improved strength properties, as compared to films made from individual polymer components.

European patent application EP-A-0,517,222 discloses a polyethylene moulding material which consists of from 50 to 80 weight percent of a HDPE, having a density of from 0.940 to 0.960 g/cm$^3$ and a MFI 190/2.16 of from 0.01 to 0.5 g/10 min. and a broad bimodal molar mass distribution, and of from 20 to 50 weight percent of a polyethylene of a density of from 0.910 to 0.925 g/cm$^3$ and a MFI 190/2.16 of from 0.5 to 2.0 g/10 min. The polyethylene moulding material has a density of from 0.930 to 0.940 g/cm$^3$ and a MFI 190/2.16 of from 0.05 to 1.0 g/10 min. The polyethylene of low density may be a linear polyethylene (LLDPE) with a narrow unimodal molar mass distribution. The European patent application discloses that pipes, sheets and films of good long term and low temperature properties can be produced. Particularly, the material is said to have extraordinary resistance to slow crack propagation (ESCR).

Additionally, ternary polymer blends are known. For example, in U.S. Pat. No. 4,824,912, Su et al. disclose LLDPE blended with minor amounts of a low molecular weight HDPE (LMW-HDPE) and a high molecular weight HDPE (HMW-HDPE) for processability and film property improvements over LLDPE used alone. The disclosures of all the above-cited references are incorporated herein by reference.

SUMMARY OF THE INVENTION

Applicants have found a novel medium modulus, molded polyethylene material having excellent impact strength and good dimensional stability, and a method to prepare such molded material.

The novel molded material has a thickness of greater than about 0.23 mm and comprises:

(A) from about 60 to about 99 weight percent, based on the combined weights of components (A) and (B), of at least one high molecular weight linear ethylene polymer having a density in the range of about 0.92 to about 0.96 g/cc and an $I_5$ melt index in the range of about 0.1 to about 3 g/10 minutes, and (B) from about 1 to about 40 weight percent, based on the combined weights of components (A) and (B), of at least one substantially linear ethylene/α-olefin interpolymer characterized as having:

i. a melt flow ratio, $I_{10}/I_2$, $\geq 5.63$, ii. a molecular weight distribution, $M_w/M_n$, defined by the equation:

$$M_w/M_n \leq (I_{10}/I_2) - 4.63, \text{ and}$$

iii. a critical shear rate at onset of surface melt fracture at least 50 percent greater than the critical shear rate at the onset of surface melt fracture of a linear olefin polymer having essentially the same $I_2$ and $M_w/M_n$ wherein the substantially linear ethylene/α-olefin interpolymer is further characterized as containing at least one α-olefin monomer and having a density in the range of about 0.85 to about 0.92 g/cc and an $I_2$ melt index in the range of 0.3 to about 3 g/10 minutes.

One method for producing such medium modulus molded polyethylene material is an extrusion process which comprises the steps of:

(1) providing an extrudable thermoplastic composition containing (A) from about 60 to about 99 weight percent, based on the combined weights of components (A) and (B), of at least one high weight molecular linear ethylene polymer having a density in the range of about 0.92 to about 0.96 g/cc and an $I_5$ melt index in the range of about 0.1 to about 3 g/10 minutes, and (B) from about 1 to about 40 weight percent, based on the combined weights of components (A) and (B), of at least one substantially linear ethylene/α-olefin interpolymer characterized as having:

i. a melt flow ratio, $I_{10}/I_2$, $\geq 5.63$, ii. a molecular weight distribution, $M_w/M_n$, defined by the equation:

$$M_w/M_n \leq (I_{10}/I_2) - 4.63, \text{ and}$$

iii. a critical shear rate at onset of surface melt fracture at least 50 percent greater than the critical shear rate at the onset of surface melt fracture of a linear olefin polymer having essentially the same $I_2$ and $M_w/M_n$ wherein the substantially linear ethylene/α-olefin interpolymer is further characterized as containing at least one α-olefin monomer and having a density in the range of about 0.85 to about 0.92 g/cc and an $I_2$ melt index in the range of 0.3 to about 3 g/10 minutes, optionally pelletizing the composition, (2) introducing said optionally pelletized composition of step (1) into an extrusion apparatus, and (3) extruding said composition of step (1) to form a material with a thickness greater than about 0.23 mm, and (4) conveying said material formed in step (3) for subsequent use down-line of the extrusion apparatus of step (2) or collecting said material formed in step (3) for subsequent use off-line.

The molded material of the present invention has improved impact performance that is not ordinarily expected for medium modulus polyethylene. The novel molded material has an improved impact strength relative to prior art molded materials having about the same density, stiffness (measured as yield strength), melt index and thickness which are produced from blends of a) high molecular weight high density polyethylene (HDPE) and b) linear low density polyethylene (LLDPE), very low density polyethylene (VLDPE), butyl rubber, ethylene-propylene copolymer (EPM) or ethylene-propylene-diene terpolymer (EPDM). At ambient temperature, the novel molded materials often have at least 30 percent, and preferably at least 50 percent, improvement in impact properties relative to the mentioned polyethylene material. The improved impact resistance reduces failures of the molded materials due to crack propagation.

BRIEF DESCRIPTION OF THE DRAWING

FIG. 1 plots data describing the relationship between $M_w/M_n$ and $I_{10}/I_2$ for three distinct polymer types: substantially linear polyethylene, heterogeneous linear polyethylene and homogeneous linear polyethylene.

GLOSSARY AND TEST METHODS

The term "interpolymer" as used herein refers to polymers prepared by the polymerization of at least two different monomers. The generic term interpolymer thus embraces copolymers, usually employed to refer to polymers prepared from two different monomers, and polymers prepared from more than two different monomers.

Low density polyethylene ("LDPE") herein designates an ethylene polymer which is generally prepared at high pressure using free radical initiators and typically has a density in the range of 0.915 to 0.940 g/cm³. LDPE is also known as "branched" polyethylene because of the relatively large number of long chain branches extending from the main polymer backbone.

High density polyethylene ("HDPE") herein designates an ethylene polymer which has a density in the range of greater than 0.940 to 0.960 g/cm³. HDPE is prepared using a coordination catalyst, e.g. Ziegler-Natta type catalysts, at low or moderate pressures, but sometimes at high pressure. HDPE is linear without any substantial side chain branching. HDPE is a substantially crystalline polymer.

Linear, low density polyethylene ("LLDPE") is generally prepared in the same manner as HDPE, but incorporates a relatively minor amount of an α-olefin comonomer such as butene, hexene or octene to introduce enough short chain branches into the otherwise linear polymer to reduce the density of the resultant polymer into the range of that of LDPE. The coordination catalysts used to interpolymerize ethylene and the α-olefin generally produce an LLDPE with a relatively broad weight molecular weight distribution, i.e., $M_w/M_n$ greater than about 3. Such LLDPE's also have relatively broad composition distribution in that the proportion of α-olefin comonomer molecules incorporated into the polymer molecules varies. Generally, the lower molecular weight polymer molecules contain a relatively higher proportion of the α-olefin comonomer than the higher molecular weight polymer molecules.

The terms "ultra low density polyethylene" (ULDPE), "very low density polyethylene" (VLDPE) and "linear very low density polyethylene" (LVLDPE) have been used interchangeably in the polyethylene art to designate the polymer subset of linear low density polyethylenes having a density less than or equal to about 0.915 g/cc. The term "linear low density polyethylene" (LLDPE) is then applied to those linear polyethylenes having a density above about 0.915 g/cc.

The terms "heterogeneous" and "heterogeneously branched" are used herein in the conventional sense in reference to a linear ethylene/α-olefin polymer having a comparatively low short chain branching distribution index. The short chain branching distribution index (SCBDI) is defined as the weight percent of the polymer molecules having a comonomer content within 50 percent of the median total molar comonomer content. The short chain branching distribution index of polyolefins can be determined by well-known temperature rising elution fractionation techniques, such as those described by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1–2, pp. 107 to 119 (1985), or U.S. Pat. No. 4,798,081, the disclosures of all which are incorporated herein by reference. Heterogeneous linear ethylene α-olefin polymers typically have a SCBDI less than about 30 percent.

The terms "homogeneous" and "homogeneously branched" are used in the conventional sense in reference to an ethylene/α-olefin polymer in which the comohomer is randomly distributed within a given polymer molecule and wherein substantially all of the polymer molecules have the same ethylene to comonomer molar ratio. Homogeneously branched polymers are characterized by a short chain branching distribution index (SCBDI) greater than or equal to 30 percent, preferably greater than or equal to 50 percent, more preferably greater than or equal to 90 percent.

The term "homogeneous linear ethylene/α-olefin polymers" means that the olefin polymer has a homogeneous short branching distribution but does not have long chain branching. That is, the linear ethylene/α-olefin polymer has an absence of long chain branching. Such polymers include linear low density polyethylene polymers and linear high density polyethylene polymers and can be made using polymerization processes (e.g., as described by Elston in U.S. Pat. No. 3,645,992, the disclosure of which is incorporated herein by reference) which provide uniform branching (i.e., homogeneously branched) distribution. Uniform branching distributions are those in which the comonomer is randomly distributed within a given interpolymer molecule and wherein substantially all of the interpolymer molecules have the same ethylene/comonomer ratio within that interpolymer. In his polymerization process, Elston uses soluble vanadium catalyst systems to make such polymers, however, others such as Mitsui Chemical Corporation and Exxon Chemical Company have used so-called single site catalyst systems to make polymers having a similar homogeneous structure.

The term "homogeneous linear ethylene/α-olefin polymers" does not refer to high pressure branched polyethylene which is known to those skilled in the art to have numerous long chain branches. Typically, the homogeneous linear ethylene/α-olefin polymer is an ethylene/α-olefin interpolymer, wherein the α-olefin is at least one $C_5$–$C_{20}$ α-olefin (e.g., 1-pentene, 4-methyl-1-pentene, 1-hexene, 1-octene and the like), preferably wherein at least one of the α-olefins is 1-octene. Most preferably, the ethylene/α-olefin interpolymer is a copolymer of ethylene and a $C_5$–$C_{20}$ α-olefin, especially an ethylene/$C_1$–$C_6$ α-olefin copolymer.

The term "medium modulus" is used herein in reference to the novel molded material to mean the calculated material density is in the range of about 0.923 to about 0.95 g/cc. The term "calculated material density" is used herein to mean the density of the material when calculated from the known weight fractions and the measured annealed densities of the component polymers or layers.

The density of the polymers used to make the medium modulus molded material of the present invention is measured in accordance with ASTM D-792 and is reported as grams/cubic centimeter (g/cc). The measurements reported in the Examples below are determined after the polymer samples have been annealed for 1 hour at 100° C. and 4 hours at 23° C. and 50% relative humidity.

Melt index measurements are performed according to ASTM D-1238, Condition 190° C./2.16 kilogram (kg) and Condition 190° C./5 kg, and are known as $I_2$ and $I_5$, respectively. Melt index is inversely proportional to the molecular weight of the polymer. Thus, the higher the molecular weight, the lower the melt index, although the relationship is not linear. Melt index is reported as g/10 minutes. Melt index determinations can also be performed with even higher weights, such as in accordance with ASTM D-1238, Condition 190° C./10 kg and Condition 190° C./21.6 kg, and are known as $I_{10}$ and $I_{21.6}$, respectively.

The term "melt flow ratio" as defined herein in the conventional sense as the ratio of a higher weight melt index determination to a lower weight determination. For measured $I_{10}$ and $I_2$ melt index values, the melt flow ratio is conveniently designated as $I_{10}/I_2$. For $I_{21.6}$ and $I_{10}$ values, the ratio is designated $I_{21.6}/I_{10}$. Other melt flow ratios are occasionally used respecting polyethylene compositions, such as, for example, $I_5/I_2$ based an $I_5$ and $I_2$ melt index measurements. In general, $I_{21.6}/I_{10}$ and $I_5/I_2$ determinations provide similar melt flow values and $I_{10}/I_2$ values are usually greater than $I_{21.6}/I_{10}$ values by a factor of about 4.4 and this factor is used for purposes of this invention in calculating certain values in the examples.

The crystallinity, as mentioned in Table 1 below is measured according to ASTM D3417-75, the heat of fusion is determined from the second heating cycle by measuring the area under the fusion endotherm by drawing a baseline from the point at −20° C. to the point at Peak temperature +20° C. The heat of fusion is divided by 292 J/g and multiplied by 100 to obtain the percent crystallinity. The tensile properties of the molded materials are measured in accordance with ASTM D 638-76 and are reported in MPa for the Yield and Ultimate tensile strengths and in percent for the Elongation. The impact properties, specifically the impact strength, of the molded material is evaluated by means of Izod Impact values and the critical strain energy release rate $G_c$. The Izod impact values are measured in accordance with ASTM D-256. The critical strain energy release rate $G_c$ is measured using the Charpy Test, in accordance with the procedure described by E. Plati and J. G. Williams in Polymer Engineering and Science, June, 1975, Vol 15, No. 6, pp. 470 to 477. The PEnsylvania Notch Test (PENT) is a Slow Crack Growth test, performed following the procedure described by X. Lu and N. Brown, Polymer Testing 11 (1992), pages 309–319; the test was conducted under a 2.4 MPa stress at 80° C. The Small Scale Steady State (S4) test is an impact test for pipes described by P. Vanspeybroek in: Proceedings Plastic Pipes VIII, Eindhoven (The Netherlands), Sept. 1992, The Plastics and Rubber Institute, p. D1/6 1–14. In this test the crack is initiated by the impact of a gas-gun fired chisel on a well supported and not pressurised initiation zone. This crack is injected in the pressurised propagation zone in an external containment against flaring and decompression and providing controlled local environment. The reported Critical Pressures $p_{c, s4}$ are the operating pressures at which a crack propagates instead of arrests and is given at different temperatures.

DETAILED DESCRIPTION OF THE INVENTION

The medium modulus, molded polyethylene material of the present invention has a calculated material density in the range of about 0.923 g/cc to about 0.95 g/cc, especially, about 0.926 g/cc to about 0.948 g/cc, and more especially, about 0.93 g/cc to about 0.946.

The thickness of the material is greater than about 0.23 mm, preferably in the range of about 0.5 mm to about 50 mm, and more preferably, in the range of about 3 mm to about 30 mm.

At ambient temperatures, these novel materials preferably have Izod Impact values and a critical strain energy release rate $G_c$ at least 30 percent greater, more preferably at least 50 percent greater, than the Izod Impact values and $G_c$ of a comparative prior art polyethylene material having about the same material density, melt index, yield strength and material thickness.

The composition comprising the components (A) and (B) described in more detail below can be molded to pipes, tubes, bars, sheets or materials of other shapes, such as automotive parts, having a material thickness of greater than about 0.23 mm. The molded material is particularly useful in applications where molded materials with a good property balance, that means with good dimensional stability, i.e. stiffness, and with good impact strength, i.e. toughness, are needed.

The high molecular weight linear ethylene polymers, Component (A), for use in preparing the medium modulus, molded polyethylene material of the instant invention are a known class of compounds which can be produced by any well-known particle-form polymerization process, such as slurry polymerization and gas phase polymerization. Preferably, the high molecular weight linear ethylene polymers are produced using well-known Phillips or Ziegler type coordination catalysts, although metallocene catalyst systems can also be used. Although preferred, with conventional Ziegler type catalysts, slurry polymerization processes are generally limited to polymer densities greater than about 0.940 g/cc and especially limited to polymer densities greater than about 0.935 g/cc, i.e., about 0.935 g/cc is the practical lower commercial limit for slurry polymerization.

The high molecular weight linear ethylene polymer can be an ethylene homopolymer or a copolymer of ethylene with at least one α-olefin of from 3 to 20 carbon atoms. However, preferably, the high molecular weight linear polymer is a copolymer with at least one $C_3$–$C_{20}$ α-olefin, such as 1-propylene, 1-butene, 1-isobutylene, 4-methyl-1-pentene, 1-hexene, 1-heptene and 1-octene. Most preferably, the high molecular weight linear ethylene polymer is an ethylene/1-butene copolymer prepared by a low pressure slurry polymerization process. The novel molded material comprises from about 60 to about 99 weight percent high molecular weight linear ethylene polymer, generally about 60 to about 95 weight percent, preferably about 60 to about 92.5 weight percent, more preferably about 65 to about 90 weight percent, and most preferably about 70 to about 85 weight percent.

Component (A) can also be a blend of linear ethylene polymers. Such blends can be prepared in-situ (e.g., by having a mixture of catalysts in a single polymerization reactor or by using different catalysts in separate reactors connected in parallel or in series) or by physical blending of polymers.

The high molecular weight linear ethylene polymer has an $I_5$ melt index in the range of about 0.1 g/10 minutes to about 3 g/10, preferably, about 0.1 g/10 minutes to about 2 g/10 minutes, more preferably, about 0.15 g/10 minutes to about 1 g/10 minutes and more preferably, about 0.15 g/10 minutes to about 0.5 g/10 minutes. Additionally, the linear polymer preferably has a bimodal molecular weight distribution (MWD) and an $I_{21.6}/I_{10}$ ratio in the range of from about 1 to about 12, preferably in the range of from about 3.5 to about 10, more preferably in the range of from about 4 to about 8, and most preferably in the range of from about 4.5 to about 6.

The high molecular weight linear ethylene polymer, which includes, but is not limited to, LLDPE, LMDPE (linear medium density polyethylene) and HDPE, and mixtures thereof, preferably has a density in the range of from about 0.92 g/cc to about 0.96 g/cc, more preferably, in the range of from about 0.93 g/cc to about 0.96 g/cc, and most preferably, in the range of from about 0.935 g/cc to about 0.958 g/cc.

The substantially linear ethylene/α-olefin polymers used in the present invention Component (B), are a unique class of compounds that are defined in U.S. Pat. Nos. 5,272,236 and 5,278,272 by Lai et al., both of which are incorporated herein by reference. Lai et al. teach that such polymers are preferably prepared by a continuous, solution phase polymerization process using the constrained geometry catalyst discovered by Stevens et al. U.S. Pat. No. 5,055,438. The substantially linear ethylene/α-olefin interpolymers contain ethylene interpolymerized with at least one $C_3$–$C_{20}$ α-olefin, such as 1-propylene, 1-butene, 1-isobutylene, 1-hexene, 4-methyl-1-pentene, 1-heptene and 1-octene, as well as other monomer types such as styrene, halo- or alkyl-substituted styrenes, tetrafluoro-ethylene, vinyl benzocyclobutane, 1,4-hexadiene, 1,7-octadiene, and cycloalkenes, e.g., cyclopentene, cyclohexene and cyclooctene. Although the substantially linear ethylene/α-olefin interpolymer can be a terpolymer where at least two α-olefin monomers are polymerized with ethylene, preferably the interpolymer is a copolymer with one α-olefin monomer copolymerized with ethylene and most preferably the substantially linear ethylene/α-olefin interpolymer is a copolymer of ethylene and 1-octene.

The substantially linear ethylene/α-olefin interpolymers used in the present invention are not in the same class as homogeneous linear ethylene/α-olefin copolymers, nor heterogeneous linear ethylene/α-olefin polymers, nor are they in the same class as traditional highly branched low density polyethylene. The substantially linear ethylene/α-olefin polymers useful in this invention are indeed a unique class of polymers which have excellent processability, even though they have relatively narrow molecular weight distributions (typically, about 2). Even more surprisingly, as described in U.S. Pat. No. 5,278,272 by Lai et al., the melt flow ratio ($I_{10}/I_2$) of the substantially linear ethylene/α-olefin interpolymers can be varied essentially independently of the polydispersity index (that is, the molecular weight distribution, $M_w/M_n$). As FIG. 1 illustrates, the rheological behavior of substantially linear ethylene polymers constitutes a dramatic contradistinction over to a homogeneous linear ethylene/α-olefin polymer and to conventional heterogeneous linear polyethylene in that both heterogeneous linear and homogeneous linear ethylene polymers have rheological properties such that the $I_{10}/I_2$ value only increases as the polydispersity index increases.

Substantially linear ethylene/α-olefin polymers (SLEP) are homogeneous polymers having long chain branching.

The long chain branches have the same comonomer distribution as the polymer backbone and can be as long as about the same length as the length of the polymer backbone. The polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Long chain branching is defined herein as a chain length of at least 6 carbons, above which the length cannot be distinguished using $^{13}C$ nuclear magnetic resonance spectroscopy. The long chain branch can be as long as about the same length as the length of the polymer backbone to which it is attached.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, p. 285–297), the disclosure of which is incorporated herein by reference.

As a practical matter, current $^{13}C$ nuclear magnetic resonance spectroscopy cannot determine the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys., 17, 1301 (1949) and Rudin, A., *Modern Methods of Polymer Characterization*, John Wiley & Sons, New York (1991) pp. 103–112, both of which are incorporated by reference.

A. Willem deGroot and P. Steve Chum, both of The Dow Chemical Company, at the Oct. 4, 1994, conference of the Federation of Analytical Chemistry and Spectroscopy Society (FACSS) in St. Louis, Mo., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$, Melt Index) as a function of Log (GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are clearly distinct from ethylene polymers produced using Ziegler-type catalysts such as titanium complexes and ordinary homogeneous catalysts such as hafnium and vanadium complexes.

For ethylene/α-olefin interpolymers, the long chain branch is longer than the short chain branch that results from the incorporation of the α-olefin(s) into the polymer backbone. The empirical effect of the presence of long chain branching in the substantial linear ethylene/α-olefin interpolymers used in the invention is manifested as enhanced rheological properties which are quantified and expressed herein in terms of gas extrusion rheometry (GER) results and/or melt flow, $I_{10}/I_2$, increases.

The term "linear" means that the polymer lacks measurable or demonstrable long chain branches, i.e., the polymer is substituted with an average of less than 0.01 long branch/ 1000 carbons.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by Van Nostrand Reinhold Co. (1982) on pp. 97 to 99, both publications of which are incorporated by reference herein in their entirety. GER experiments are performed herein at a temperature of 190° C., at nitrogen pressures between 250 to 5500 psig using a 3.81 cm diameter die and a 20:1 L/D rheometer with an entrance angle of 180° C. The processing index is measured herein at 3,000 psig.

For the substantially linear ethylene/α-olefin interpolymers used herein, the PI is the apparent viscosity (in kpoise) of a material measured by GER at an apparent shear stress of $2.15 \times 10^6$ dyne/cm$^2$. The substantially linear ethylene/α-olefin interpolymers used herein preferably have a PI in the range of 0.01 kpoise to 50 kpoise, preferably 15 kpoise or less. The substantially linear ethylene/α-olefin interpolymers used herein have a PI less than or equal to 70 percent of the PI of a comparative linear ethylene polymer (either a Ziegler polymerized polymer or a linear uniformly branched polymer as described by Elston in U.S. Pat. No. 3,645,992) at about the same $I_2$ and $M_w/M_n$.

An apparent shear stress versus apparent shear rate plot can be used to identify the melt fracture phenomena. According to Ramamurthy in the Journal of Rheology, 30(2), 337 to 357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." In this disclosure, the onset of surface melt fracture (OSMF) is characterized at the beginning of losing extrudate gloss at which the surface roughness of the extrudate can only be detected by 40× magnification. The critical shear rate at the onset of surface melt fracture for the substantially linear ethylene/α-olefin interpolymers is at least 50 percent greater than the critical shear rate at the onset of surface melt fracture of a comparative linear ethylene polymer (either a Ziegler polymerized heterogeneously branched polymer or a homogeneously branched polymer as described by Elston in U.S. Pat. No. 3,645,992) having essentially the same $I_2$ and $M_w/M_n$. Preferably, the critical shear stress at onset of surface melt fracture for the substantially linear ethylene/α-olefin interpolymers is greater than $2.8 \times 10^6$ dynes/cm$^2$.

Gross melt fracture occurs at unsteady extrusion flow conditions and ranges in detail from regular (alternating rough and smooth, helical, etc.) to random distortions. For commercial acceptability, (for example, in molded parts), surface defects should be minimal, if not absent, for good quality and properties. The critical shear rate at the onset of surface melt fracture (OSMF) and the onset of gross melt fracture (OGMF) will be used herein based on the changes of surface roughness and configurations of the extrudate. For the substantially linear ethylene/α-olefin interpolymers, the critical shear stress at onset of gross melt fracture is preferably greater than $4 \times 10^6$ dynes/cm$^2$.

To more fully characterize the rheological behavior of the unique substantially linear ethylene/α-olefin interpolymers, S. Lai and G. W. Knight introduced (ANTEC '93 Proceedings, INSITE™ Technology Polyolefins (ITP)— New Rules in the Structure/Rheology Relationship of Ethylene α-Olefin Copolymers, New Orleans, La., May 1993) another rheological measurement, the Dow Rheology Index (DRI), which expresses a polymer's "normalized relaxation time as the result of long chain branching." DRI ranges from 0 for polymers which do not have any measurable long chain branching (e.g., "TAFMER" and "EXACT" products sold commercially by Mitsui Chemical and Exxon Chemical Company, respectively) to about 15 and is independent of melt index. In general, for low to medium density ethylene polymers (particularly at lower densities) DRI provides improved correlations to melt elasticity and high shear flowability relative to correlations of the same attempted with melt flow ratios. For the substantially linear ethylene/α-olefin polymers used in this invention, DRI is preferably at least about 0.1, and especially at least about 0.5, and most especially at least 0.8. DRI can be calculated from the equation:

$$DRI = (3652879 * \tau_o 1.00649 / \eta_o - 1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e.

$$\eta/\eta_o = 1/(1+(\gamma*\tau_o)1-n)$$

where n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 190° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 3.81 centimeter diameter die and 20:1 L/D rheometer at 190° C. Specific material determinations can be performed from 140° to 190° C. as required to accommodate melt index variations.

Substantially linear ethylene/α-olefin interpolymers are considered to be "homogeneous" in composition distribution since substantially all of the polymer molecules have the same ethylene-to-comonomer ratio. Moreover, the substantially linear ethylene polymers have a narrow short chain (homogeneous) branching distribution, as defined by U.S. Pat. No. 3,645,992. The distribution of comonomer branches for the substantially linear ethylene/α-olefin interpolymers is characterized by its SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF"). The SCBDI or CDBI for the substantially linear ethylene/α-olefin interpolymers used in the present invention is preferably greater than 30 percent, especially greater than 50 percent.

The substantially linear ethylene/α-olefin polymers used in this invention essentially lack a measurable "high density" fraction, as measured by the TREF technique. Preferably, the substantially linear ethylene/α-olefin interpolymers do not contain a polymer fraction with a degree of branching less than or equal to 2 methyls/1000 carbons. The "high density polymer fraction" can also be described as a polymer fraction with a degree of branching less than 2 methyls/1000 carbons.

The molecular weight and molecular weight distribution, $M_w/M_n$ ratio, of substantially linear ethylene/α-olefin interpolymers can be analyzed by gel permeation chromatography (GPC) on a Waters 150 high temperature chromatographic unit equipped with differential refractometer and three columns of mixed porosity. The columns are supplied by Polymer Laboratories and are commonly packed with pore sizes of $10^3$, $10^4$, $10^5$ and $10^6$ Å. The solvent is 1,2,4-trichlorobenzene, from which 0.3 percent by weight solutions of the samples are prepared for injection. The flow rate is 1.0 milliliters/minute, unit operating temperature is 140° C. and the injection size is 100 microliters.

The molecular weight determination with respect to the polymer back-bone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, p. 621, 1968) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

For the substantially linear ethylene/α-olefin interpolymers used in the present invention, the $M_w/M_n$ is preferably less than 3, especially from 1.5 to 2.5.

The novel molded material comprises from about 1 to about 40 weight percent, based on the combined weight of components (A) and (B), of the substantially linear ethylene/α-olefin interpolymer, generally from about 5 to about 40 weight percent, preferably from about 7.5 to about 40 weight percent, more preferably from 10 to about 35 weight percent, and most preferably from about 15 to about 30 weight percent.

The substantially linear ethylene/α-olefin interpolymer used to prepare the molded material of the present invention has an $I_2$ melt index in the range of about 0.3 g/10 minutes to about 3 g/10, preferably, about 0.3 g/10 minutes to about 2.5 g/10 minutes and, more preferably, about 0.4 g/10 minutes to about 2 g/10 minutes. The substantially linear ethylene/α-olefin interpolymer has a density in the range of about 0.85 g/cc to about 0.92 g/cc, preferably, in the range of about 0.85 g/cc to about 0.916 g/cc, more preferably, in the range of about 0.86 g/cc to about 0.91 g/cc., and most preferably in the range of about 0.86 g/cc to about 0.89 g/cc. The $I_{10}/I_2$ ratio of the substantially linear ethylene/α-olefin interpolymers is in the range from about 5.63 to about 30, preferably less than about 20, especially less than about 15, and most especially less than about 10.

Component (B) can be a blend of substantially linear ethylene/α-olefin interpolymers. Component (B) may be blended with at least one heterogeneous or homogeneous linear ethylene polymer (C) selected from the group consisting of ULDPE and LLDPE, preferably with a heterogeneous ULDPE. The total weight of components (B) and (C) preferably is up to about 40 weight percent, more preferably up to about 35 weight percent, most preferably up to about 30 weight percent, based on the combined weight of components (A), (B) and (C).

Heterogeneously branched ULDPE and LLDPE are well known and commercially available materials. They are typically prepared using Ziegler-Natta catalysts in solution or gas phase polymerization processes Anderson et al., U.S. Pat. No. 4,076,698, is illustrative. These traditional Ziegler-type linear polyethylenes are not homogeneously branched and they do not have any long-chain branching. Heterogeneously branched ULDPE and LLDPE typically having molecular weight distributions, $M_w/M_n$, in the range of from about 3.5 to about 4.1.

Homogeneously branched ULDPE and LLDPE are also well known. Elston disclosure in U.S. Pat. No. 3,645,992 is illustrative. Homogeneously branched ULDPE and LLDPE can be prepared in conventional polymerization processes using Ziegler-type catalysts such as, for example, zirconium and vanadium catalyst systems as well as using metallocene catalyst systems such as, for example, those based on hafnium. Ewen et al. disclosure in U.S. Pat. No. 4,937,299 and Tsutsui et al. disclosure in U.S. Pat. No. 5,218,071 are illustrative. The disclosures of Elston Ewen et al. and Tsutsui et al. are incorporated herein by reference. This second class of linear polyethylenes are homogeneously branched polymers, and like traditional Ziegler-type heterogeneous linear polyethylenes, they do not have any long-chain branching. Homogeneously branched ULDPE and LLDPE typical having molecular weight distributions, $M_w/M_n$, of about 2. Commercial examples of homogeneously branched linear polyethylenes include those sold by Mitsui Petrochemical Industries under the designation "TAFMER" and by Exxon Chemical Company under the designation "EXACT".

The molded polyethylene material of the present invention can be produced by known processes, for example by casting processes, compression molding or, preferably, by extrusion.

In a typical extrusion process, a polyethylene composition is introduced into a screw extruder wherein it is melted and forwarded through the extruder under pressure. The molten polymer composition is forced through a flat or annular die to form a molten sheet or tube. The extruder temperature is preferably in the range from about 160° C. to about 250° C., more preferably from about 170° C. to about 210° C. It is known how to produce the material of the desired thickness.

Both monolayer and multilayer molded polyethylene materials can be prepared by extrusion and the materials of the present invention can be monolayer or multilayer structures. Multilayer molded polyethylene materials can be prepared by any known technique in the art, including, for example, coextrusion, lamination or combinations of both, and the like. However, the preferred medium modulus, molded polyethylene material of the present invention is a monolayer structure.

Components (A) and (B), and optional Component (C), used to prepare the molded material of this invention, can be individually blended (i.e., where a component itself is a polymer blend of two or more subcomponent polymers) or admixed together by any suitable means known in the art. Suitable means are thought to include tumble dry-blending the components together prior to charging the extruder, weight-feeding the components directly into the extruder, melt-blending the components via compound or side-arm extrusion prior to introduction into the extruder, multiple reactor polymerization of the components with reactors in series or in parallel and optionally with different catalyst and/or monomer types in each reactor, or the like as well as combinations thereof.

Additives, such as antioxidants (e.g., hindered phenolics, such as Irganox® 1010 or Irganox® 1076 supplied by Ciba Geigy), phosphites (e.g., Irgafos® 168 also supplied by Ciba Geigy), cling additives (e.g., PIB), stearates, Standostab PEPQ® (supplied by Sandoz), pigments, colorants, such as carbon black, fillers, and the like can also be included in the molded material of the present invention, or the polymer compositions used to make the same, to the extent that such additives or ingredients do not interfere with the improved impact strength discovered by Applicants. Although generally not required, the molded material of the present invention can also contain additives to enhance antiblocking and coefficient of friction characteristics including, but not limited to, untreated and treated silicon dioxide, talc, calcium carbonate, and clay, as well as primary, secondary and substituted fatty acid amides, release agents, silicone coatings, etc. Still other additives, such as quaternary ammonium compounds alone or in combination with ethylene-acrylic acid (EAA) copolymers or other functional polymers, can also be added to enhance the antistatic characteristics of the polyethylene material of this invention.

Advantageously, because of the improved strength properties of the novel polyethylene material, recycled and scrap materials as well as diluent polymers can be incorporated or admixed into the polyethylene compositions used to make the novel molded polyethylene material at higher loadings than is typically possible with prior art polyethylene compositions and still provide or maintain the desired performance properties. Suitable diluent materials include, for example, elastomers, rubbers and anhydride modified polyethylenes (e.g., polybutylene and maleic anhydride grafted LLDPE and HDPE) as well as with high pressure polyethylenes such as, for example, low density polyethylene (LDPE), ethylene/acrylic acid (EAA) interpolymers, ethylene/vinyl acetate (EVA) interpolymers and ethylene/methacrylate (EMA) interpolymers, and combinations thereof and the like.

EXAMPLES

The following examples illustrate some of the particular embodiments of the present invention, but the following should not be construed to mean the invention is limited only to the particular embodiments shown. Unless otherwise mentioned, all parts and percentages are by weight.

Examples 1 to 5 and Comparative Examples A to J

Compression molded bars of various thicknesses are produced as follows: Polymers and polymer blends of the compositions listed in Table 1 below are extruded on a Leistritz ZSE65 counterrotating twin screw extruder after dry blending and adding 1000 ppm of each of Irganox™ 1010, Irgafos™ 168, zinc stearate and calcium stearate. The temperature settings of the different zones are 180°/190°/200°/200°/200°/210°/210° C. The melt temperature is approximately 212° C. at a screw speed of 40 RPM (revolutions per minute) and an output rate of approximately 25.4 kg/hr. The specific energy is 0.254 kWh/kg.

The extruded pellets are compression molded on a Fontijne hot press for 5 min. at 3 ton ram force and for 6 min. at 28 ton ram force at a temperature of 190° C. for tensile and Izod impact measurements. The procedure for preparing the samples for the PENT and $G_c$ measurements is as follows: 520 g of material is placed into a 12 mm thick steel mould which is isolated at the sides by a teflon frame, the sample is heated for 3 minutes at 160° C. without pressure, followed by 3 minutes at 10.6 ton ram force, 1 minute without pressure, 1 minute at 10.6 ton ram force and 1 minute without pressure. The temperature is increased to 180° C. and a ram force of 10.6 ton is applied for 11 minutes. Two one minute cycles of pressure release and pressurizing at 10.6 ton ram force are applied. After 1 minute of pressure release, the sample is pressurized again at 2.6 ton ram force and allowed to cool slowly overnight. From this sheet the test specimens are machined with the required dimensions. For the Izod Impact measurements bars of 63.5 mm×12.7 mm×4 mm are used; the $G_c$ measurements are conducted on bars of 125 mm×10 mm× 10 mm; and the PENT test is made with bars of 50 mm×25 mm×10 mm.

The polymers used in the various formulations are:

1. HDPE1 (Component A) is a high molecular weight HDPE resin having a melt index $I_5$ =0.28 g/10 min., a density of 0.952 g/cm$^3$, and a melt flow ratio $I_{21}/I_5$ of 23 (Comonomer: 1-butene).
2. HDPE 2 (Component A) is a high molecular weight HDPE resin having an $I_5$ of 0.75 g/10 min. and a density of 0.952 g/cm$^3$ (Comonomer: 1-butene).
3. SLEP 1 is a substantially linear ethylene-octene copolymer having a melt index $I_2$ of 0.82 g/10 min., a density of 0.87 g/cm$^3$, a melt flow ratio $I_{10}/I_2$ of 7.9, $M_w/M_n$ of 1.98, a Critical Shear Rate of 503 s$^{-1}$ and a Critical Shear Stress of 3.0*10$^6$ dyne/cm$^2$.
4. SLEP 2 is a substantially linear ethylene-octene copolymer having an $I_2$ of 1.0 g/10 min., a density of 0.902 g/cm$^3$, a melt flow ratio $I_{10}/I_2$ of 9.52, $M_w/M_n$ of 2.19, a Critical Shear Rate of 1386 s$^{-1}$ and a Critical Shear Stress of 4.3*10$^6$ dyne/cm$^2$.
5. VLDPE is an ethylene-octene copolymer having an $I_2$ of 1 g/10 min., a density of 0.907 g/cm$^3$, a melt flow ratio $I_{10}/I_2$ of 9.4 and $M_w/M_n$ of 3.5.
6. LLDPE is an ethylene-octene copolymer, having an $I_2$ of 0.94 g/10 min., a density of 0.92 g/cm$^3$, a melt flow ratio $I_{10}/I_2$ of 8.6 and $M_w/M_n$ of 3.3.
7. Mitsui Tafmer™ P-0480 ULDPE is an ethylene-propylene copolymer having an $I_2$=1 g/10 min., a density of 0.87 g/cm$^3$ and a melt flow ratio $I_{10}/I_2$ of 5.9.
8. Elastomer: Union Carbide Flexomer™ GERS-1085 is used which is an ethylene-butene copolymer with a narrow molecular weight distribution. The elastomer has a density of 0.884 g/cm$^3$ and a Mooney viscosity ML (1+4) 125° C. of 30.
9. Polysar™ Butyl 100 is a Butyl rubber having a density of 0.92 g/cm$^3$ and a Mooney viscosity ML 8 (125° C.) of 45.
10. Polysar™ Butyl 301 is a Butyl rubber having a density of 0.92 g/cm$^3$ and a Mooney viscosity ML8 (125° C.) of 51.
11. EPM rubber having a density (specific gravity) of 0.86 g/cm$^3$ and a Mooney viscosity ML(1+4) 125° C. of 25; it is commercially available from Exxon under the trademark Vistalon 504.
12. EDPM rubber having a density of 0.86 g/cm$^3$ and a Mooney viscosity ML(1+4) 125° C. of 25; it is commercially available from Exxon under the trademark Vistalon 2504.

Polymers 1–6 are supplied by The Dow Chemical Company.

TABLE 1

| (Comp.) Example | A | 1 | 2 | 3 |
|---|---|---|---|---|
| Composition | 100% HDPE1 | 95% HDPE1 5% SLEP1 | 90% HDPE1 10% SLEP2 | 90% HDPE1 10% SLEP1 |
| $I_5$ [g/10 min] | 0.28 | 0.28 | 0.43 | 0.33 |
| $I_{21.6}$ [g/10 min] | 6.50 | 7.19 | 9.40 | 7.57 |
| Ratio $I_{21.6}/I_5$ | 23.2 | 25.7 | 23.2 | 22.9 |
| Crystallinity [%] | 71.2 | 67.1 | | 61.7 |
| Density meas. [g/cm$^3$] calc. | 0.9511 — | 0.9466 0.9467 | 0.9460 0.9460 | 0.9445 0.9424 |
| Yield strength [MPa] | 23.3 | 21.2 | 21.4 | 19.7 |
| Ultim. Tens. strength [MPa] | 38.1 | 40.7 | 40.8 | 36.6 |
| Elongation [%] | 855 | 909 | 923 | 840 |
| Izod Impact [J/m] | | | | |
| 20° C. | 246 | 391 | 383 | 831 |
| 0° C. | 205 | 304 | 287 | 830 |
| −20° C. | 185 | | 204 | 384 |
| Gc [kJ/m$^2$] 20° C. | 11.9 | 17.1 | 16.6 | 29.0 |
| PENT [min] | 2204 | 6248 | 2829 | 10872 |

Density meas. = measured density
Density calc. = calculated density

TABLE 1-continued

| (Comp.) Example | B | C | 4 | D |
|---|---|---|---|---|
| Composition | 82% HDPE1 18% LLDPE | 87% HDPE1 13% VLDPE | 80% HDPE1 20% SLEP1 | 74% HDPE1 36% VLDPE |
| $I_5$ [g/10 min] | 0.41 | 0.39 | 0.46 | 0.69 |
| $I_{21.6}$ [g/10 min] | 9.00 | 8.85 | 8.60 | 12.90 |
| Ratio $I_{21.6}/I_5$ | 22.0 | 22.7 | 18.7 | 18.7 |
| Crystallinity [%] | 58.7 | 61.3 | 57.9 | 60.4 |
| Density meas. [g/cm³] | 0.9447 | 0.9451 | 0.9348 | 0.9345 |
| calc. | 0.9453 | 0.451 | 0.9339 | 0.9347 |
| Yield strength [MPa] | 20.6 | 20.6 | 15.9 | 15.8 |
| Ultim. Tens. strength [MPa] | 39.4 | 30.5 | 36.1 | 36.6 |
| Elongation [%] | 908 | 761 | 868 | 926 |
| Izod Impact [J/m] | | | | |
| 20° C. | 309 | 379 | 815 (no break) | 705 |
| 0° C. | 233 | 263 | 864 (no break) | 689 |
| −20° C. | | | | |
| Gc [kJ/m²] | | | | |
| 20° C. | 14.4 | 15.6 | 49.1 | 29.0 |
| PENT [min] | 11169 | 12003 | 933 (yielding) | >78000 |

Density meas. = measured density
Density calc. = calculated density

| (Comp.) Example | 5 | E | F | G |
|---|---|---|---|---|
| Composition | 80% HDPE2 20% SLEP1 | 90% HDPE1 10% ULDPE | 88% HDPE1 12% Elastomer | 91% HDPE1 9% Butyl 100 |
| $I_5$ [g/10 min] | 1.18 | 0.42 | 0.44 | 0.35 |
| $I_{21.6}$ [g/10 min] | 22.05 | 8.77 | 9.42 | 8.59 |
| Ratio $I_{21.6}/I_5$ | 18.7 | 21.0 | 21.4 | 24.5 |
| Crystallinity [%] | 56.6 | 65 | 66 | 68 |
| Density meas. [g/cm³] | 0.9340 | 0.9416 | 0.9443 | 0.9476 |
| calc. | 0.9339 | 0.9423 | 0.9425 | 0.9482 |
| Yield strength [MPa] | 16.2 | 19.48 | 19.92 | 19.56 |
| Ultim. Tens. strength [MPa] | 35.5 | 33.48 | 35.45 | 29.87 |
| Elongation [%] | 918 | 943 | 868 | 806 |
| Izod Impact [J/m] | | | | |
| 20° C. | 740 | 579 | 553 | 302 |
| 0° C. | | 571 | 413 | 155 |
| −20° C. | | 273 | 150 | 89 |
| Gc [kJ/m²] | | | | |
| 20° C. | 33.2 | 20.58 | 18.77 | 7.9 |
| 0° C. | | 17.09 | 14.63 | 6.33 |
| −20° C. | | 7.31 | 6.34 | 4.32 |
| PENT [min] | 45 | 108 | 2337 | 1959 |

Density meas. = measured density
Density calc. = calculated density

| (Comp.) Example | H | I | J |
|---|---|---|---|
| Composition | 91% HDPE1 9% Butyl 301 | 91% HDPE1 9% EPM | 91% HDPE1 9% EDPM |
| $I_5$ [g/10 min] | 0.32 | 0.38 | 0.37 |
| $I_{21.6}$ | 8.21 | 8.87 | 8.76 |

TABLE 1-continued

| | | | |
|---|---|---|---|
| [g/10 min] | | | |
| Ratio $I_{21.6}/I_5$ | 25.7 | 23.3 | 23.7 |
| Crystallinity [%] | 66 | 70 | 66 |
| Density meas. [g/cm³] calc. | 0.9495<br>0.9482 | 0.9435<br>0.9421 | 0.9438<br>0.9421 |
| Yield strength [MPa] | 22.18 | 20.14 | 19.47 |
| Ultim. Tens. strength [MPa] | 37.54 | 35.02 | 23.78 |
| Elongation [%] | 863 | 909 | 647 |
| Izod Impact [J/m] | | | |
| 20° C. | 420 | 448 | 530 |
| 0° C. | 149 | 632 | 615 |
| –20° C. | 81 | 325 | 147 |
| Gc [kJ/m²] | | | |
| 20° C. | 8.46 | 10.3 | 17.26 |
| 0° C. | 6.2 | 6.51 | 13.49 |
| –20° C. | 4.57 | 4.24 | 5.37 |
| PENT [min] | 1956 | 2781 | 885 |

Density meas. + measured density
Density calc. = calculated density

Table 1 lists both measured and calculated sheet density and measured melt indexes and melt flow ratios.

Table 1 illustrates the effect of modifying high molecular weight (HMW) HDPE with SLEP 1 at a level of 10 percent SLEP 1 (example 3). The Izod impact value and the critical strain energy release rate $G_c$ are about three times as high as the values of HDPE alone (comparative example A). For similar stiffness or yield strength, blends of HMW HDPE with LLDPE or VLDPE (comparative examples B and C) give only small improvements versus the HDPE alone. The bars of comparative examples B and C have essentially the same density and thickness and a similar melt index $I_5$ as the bars of example 3, but much lower Izod impact values and much lower $G_c$ values than the bars of example 3. For a yield strength of 21.2 MPa both the blends of examples 1 and 2 give similar Izod impact properties and $C_c$ values. The slow crack growth parameter PENT, however, is twice as high with the blend of example 1 versus the blend of example 2. Differences between the examples 3 and 5, especially in the PENT result, can be attributed to the higher $M_w$ of the high density component A in the former blend.

The comparison between examples 1 and 2 illustrate that, within the preferred density range of about 0.86 g/cc to about 0.91 g/cc for the substantially linear ethylene/α-olefin, (SLEP), those SLEP's are preferred which have a density of from about 0.86 g/cc to about 0.89 g/cc.

The compression molded bars of example 3 have an Izod Impact value which is at least 15 percent higher than the Izod Impact value of all comparative examples. With the exception of comparative example D (which has a low yield strength), the Izod impact of all comparative examples is even at least 30 percent lower than the Izod Impact value of example 3. Furthermore, the molded bars of example 3 show excellent results in the $G_c$ test (critical strain energy release rate).

Furthermore, the compression molded bars of examples 1 and 2 have a higher stiffness (yield strength) and a higher $G_c$ value than comparative examples B and C, whereas their Izod impact is higher than the Izod impact of comparative example B and similar to the Izod impact of comparative example C. Examples 1 and 2 are not comparable with comparative examples D, E, F, G, I and J because the yield strength of comparative examples D, E, F, G, I and J is considerably lower than the yield strength of examples 1 and 2. Examples 1 and 2 do not show a better Izod Impact value than comparative example H but a considerably better $G_c$ value and PENT value.

Example 3, having a similar yield strength as comparative examples E, F, G, I and J, show higher Izod impact, $G_c$ and PENT values than these comparative examples.

Examples 6 and 7

To produce the pipes of examples 6 and 7 respectively, the resin blends of examples 1 and 3 respectively are used which, however, additionally contain 2.25 percent of carbon black. A pipe having a diameter of 125 mm and a wall thickness of 11.4 mm (Standard Dimension Ratio of 11) is produced on a Weber 90 (90 mm extruder) equipped with a Gneuss rotating melt filter and fitted with the appropriate standard mandrel and pipe die. The melt temperature ranges from 190° C. to 210° C. at 126 rpm of the extruder. The extruder output is 430 kg/hr at a die pressure of 165 to 170 bar, this corresponds to a pipe production output of 1.753 m/min. The extruded pipe is vacuum calibrated and water cooled.

The critical pressures $P_{c,s4}$ measured in the Small Scale Steady State (S4) rapid crack growth tests are as follows:

| Temperature | Example 6 | Example 7 |
|---|---|---|
| 0° C. | >10 bar | >10 bar |
| –10° C. | >10 bar | >10 bar |
| –15° C. | >10 bar | >8 bar |

For commercially available polyethylene gas pipes of a diameter of 110 mm and a wall thickness of 10 mm (Standard dimension ratio of 11) the following values were reported by P. Vanspeybroek (P. Vanspeybroek, Proceedings of Plastic Pipes VIII, Eindhoven, The Netherlands, September 1992, The Plastics and Rubber Institute, p. D1/6-1–14): $P_{c,S4}$:

2.5 bar (at 0° C.)
1.8 bar (at −10° C.)
1.8 bar (at −15° C.).

We claim:

1. A medium modulus, molded polyethylene material characterized as having a thickness greater than about 0.23 mm which comprises:
   (A) from about 70 to about 99 weight percent, based on the combined weight of components (A) and (B), of at least one high molecular weight linear ethylene polymer having a density in the range of about 0.93 to about 0.96 g/cc and an $I_5$ melt index in the range of about 0.1 to about 3 g/10 minutes, and
   (B) from about 1 to about 30 weight percent, based on the combined weight of components (A) and (B), of at least one substantially linear ethylene/α-olefin interpolymer characterized as having:
      i. a melt flow ratio, $I_{10}/I_2$, $\geq 5.63$,
      ii. a molecular weight distribution, $M_w/M_n$, defined by the equation:

$$M_w/M_n \leq (I_{10}/I_2) - 4.63, \text{ and}$$

iii. a critical shear rate at onset of surface melt fracture at least 50 percent greater than the critical shear rate at the onset of surface melt fracture of a linear olefin polymer having essentially the same $I_2$ and $M_w/M_n$
   wherein the substantially linear ethylene/α-olefin polymer is further characterized as containing at least one α-olefin monomer and having a density in the range of about 0.85 to about 0.92 g/cc and an $I_2$ melt index in the range of 0.3 to about 3 g/10 minutes.

2. The material of claim 1 wherein said material comprises from about 70 to about 95 weight percent of said component (A) and from about 5 to about 30 weight percent of said component (B), based on the combined weights of components (A) and (B).

3. The material of claim 1 wherein said material is a pipe, tube, bar, wire coating, sheet, an automotive part or a container.

4. The material of claim 1 wherein its thickness is in the range of about 0.5 mm to about 50 mm.

5. The material of claim 4 wherein its thickness is in the range of about 3 mm to about 30 mm.

6. The material of claim 1 wherein the calculated density is in the range of about 0.923 g/cc to about 0.95 g/cc.

7. The material of claim 1 wherein said high molecular weight linear ethylene polymer is an interpolymer of ethylene and at least one α-olefin selected from the group consisting of 1-propylene, 1-butene, 4-methyl-1-pentene, 1-hexene and 1-octene.

8. The material of claim 7 wherein said high molecular weight linear ethylene interpolymer is a copolymer of ethylene and 1-butene.

9. The material of claim 1 wherein said substantially linear ethylene/α-olefin polymer is further characterized as having from about 0.01 long chain branches/1000 carbons to about 3 long chain branches/1000 carbons along the polymer backbone.

10. The material of claim 1 wherein said substantially linear ethylene/α-olefin polymer is an interpolymer of ethylene and at least one α-olefin selected from the group consisting of 1-propylene, 1-butene, 4-methyl-1-pentene, 1-hexene and 1-octene.

11. The material of claim 10 wherein said substantially linear ethylene/α-olefin interpolymer is a copolymer of ethylene and 1-octene.

12. The material of claim 1 wherein said high molecular weight linear ethylene polymer has an $I_5$ melt index in the range of about 0.1 g/10 minutes to about 2 g/10 minutes.

13. The material of claim 12 wherein said high molecular weight linear ethylene polymer has an $I_5$ melt index in the range of about 0.15 g/10 min. to about 0.5 g/10 min.

14. The material of claim 1 wherein said substantially linear ethylene polymer has an $I_2$ melt index in the range of about 0.3 g/10 minutes to about 2.5 g/10 minutes.

15. The material of claim 1 in the shape of a pipe or tube.

16. The material of claim 1 wherein said substantially linear ethylene polymer has a density in the range of about 0.855 g/cc to about 0.918 g/cc.

17. A method for preparing a medium modulus molded polyethylene material comprising the steps of:
   (1) providing an extrudable thermoplastic composition containing (A) from about 70 to about 99 weight percent, based on the combined weights of components (A) and (B), of at least one high molecular weight linear ethylene polymer having a density in the range of about 0.93 to about 0.96 g/cc and an $I_5$ melt index in the range of about 0.1 to about 3 g/10 minutes, and (B) from about 1 to about 30 weight percent, based on the combined weights of components (A) and (B), of at least one substantially linear ethylene/α-olefin interpolymer characterized as having:
      i. a melt flow ratio, $I_{10}/I_2$, $\geq 5.63$,
      ii. a molecular weight distribution, $M_w/M_n$, defined by the equation:

$$M_w/M_n \leq (I_{10}/I_2) - 4.63, \text{ and}$$

iii. a critical shear rate at onset of surface melt fracture at least 50 percent greater than the critical shear rate at the onset of surface melt fracture of a linear olefin polymer having essentially the same $I_2$ and $M_w/M_n$
   wherein the substantially linear ethylene/α-olefin interpolymer is further characterized as containing at least one α-olefin monomer and having a density in the range of about 0.85 to about 0.92 g/cc and an $I_2$ melt index in the range of 0.3 to about 3 g/10 minutes,
   (2) introducing said composition of step (1) into an extrusion apparatus, and
   (3) extruding said composition of step (1) to form a material with a thickness greater than about 0.23 mm, and
   (4) conveying said material formed in step (3) for subsequent use down-line of the extrusion apparatus of step (2) or collecting said material formed in step (3) for subsequent use off-line.

18. The method of claim 17 wherein said extrusion apparatus is equipped with an annular die through which said thermoplastic composition is extruded to form a molten thermoplastic tube.

19. The method of claim 17 wherein said extrudable thermoplastic material comprises from about 70 to about 95 weight percent of said component (A) and from about 5 to about 30 weight percent of said component (B), based on the combined weights of components (A) and (B).

20. The method of claim 17, wherein the composition of step (1) is pelletized before it is introduced into the extrusion apparatus.

* * * * *